(12) United States Patent
Holbrook

(10) Patent No.: US 6,860,164 B1
(45) Date of Patent: Mar. 1, 2005

(54) METER INSTALLATION SYSTEM

(76) Inventor: Edward Holbrook, 2580 Elyria Ave., Largo, FL (US) 33770-4338

( * ) Notice: Subject to any disclaimer, the term of this patent is extended or adjusted under 35 U.S.C. 154(b) by 353 days.

(21) Appl. No.: 10/224,123

(22) Filed: Aug. 20, 2002

(51) Int. Cl.[7] ........................ G01F 15/18; G01D 11/00
(52) U.S. Cl. .................. 73/866.5; 73/201; 137/315.06
(58) Field of Search ............................. 73/866.5, 201; 137/315.06, 315.01

(56) References Cited

U.S. PATENT DOCUMENTS

| 1,747,933 | A | * | 2/1930 | Goodman et al. | ............ 138/94 |
| 2,126,484 | A | * | 8/1938 | Maclean | ..................... 73/1.28 |
| 2,376,108 | A | * | 5/1945 | Zucrow | ............... 73/861.46 X |
| 2,524,241 | A | * | 10/1950 | Vetter | ..................... 73/861.01 |
| 2,708,316 | A | * | 5/1955 | Fredd | ...................... 33/544.2 |
| 2,971,431 | A | * | 2/1961 | Glenn | ................... 73/61.71 X |
| 3,444,578 | A | * | 5/1969 | Caperton | ................. 15/104.31 |
| 3,497,899 | A | * | 3/1970 | Caperton | ................. 15/104.31 |
| 3,842,864 | A | * | 10/1974 | Riegel et al. | ................. 138/93 |
| 3,922,921 | A | * | 12/1975 | Woo | .......................... 73/866.5 |
| 4,481,814 | A | * | 11/1984 | Wentzell | ..................... 73/866.5 |
| 6,263,747 | B1 | * | 7/2001 | Carson et al. | ............. 73/866.5 |
| 2002/0008130 | A1 | * | 1/2002 | Fisher et al. | ................... 226/90 |

FOREIGN PATENT DOCUMENTS

| CA | 2326018 A1 | * | 5/2002 | ............. E04H/4/10 |
| JP | 05255957 A | * | 10/1993 | ............ 137/315.06 |
| WO | WO 8701426 A | * | 3/1987 | ............. F16L/1/00 |

* cited by examiner

Primary Examiner—Thomas P. Noland
(74) Attorney, Agent, or Firm—Edward P. Dutkiewicz

(57) ABSTRACT

A meter installation system has a hollow support arm with a first end and a second end and a central vertical portion there between. A retention device has a vertical slit defining a first edge and a second edge. A coupling bar lies adjacent to the first edge. A swivel is secured in line with the hollow coupling bar and has a flexible strap coupled between the swivel and the second edge to enable the diameter of the cylindrical retention device to vary. A crank adjacent to the first end of the support arm allows the user to supply rotational energy. A series of beveled gears transmit rotational energy from the crank through the hollow support arm and to the swivel to facilitate changing the retention device between the open position and the closed position.

3 Claims, 3 Drawing Sheets

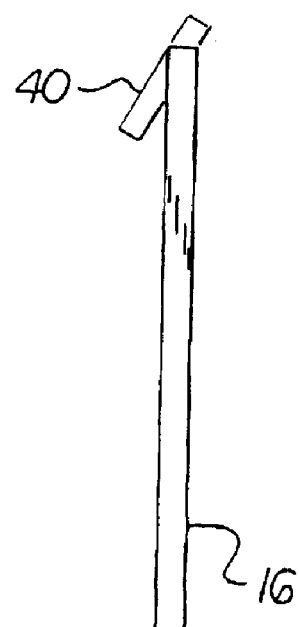
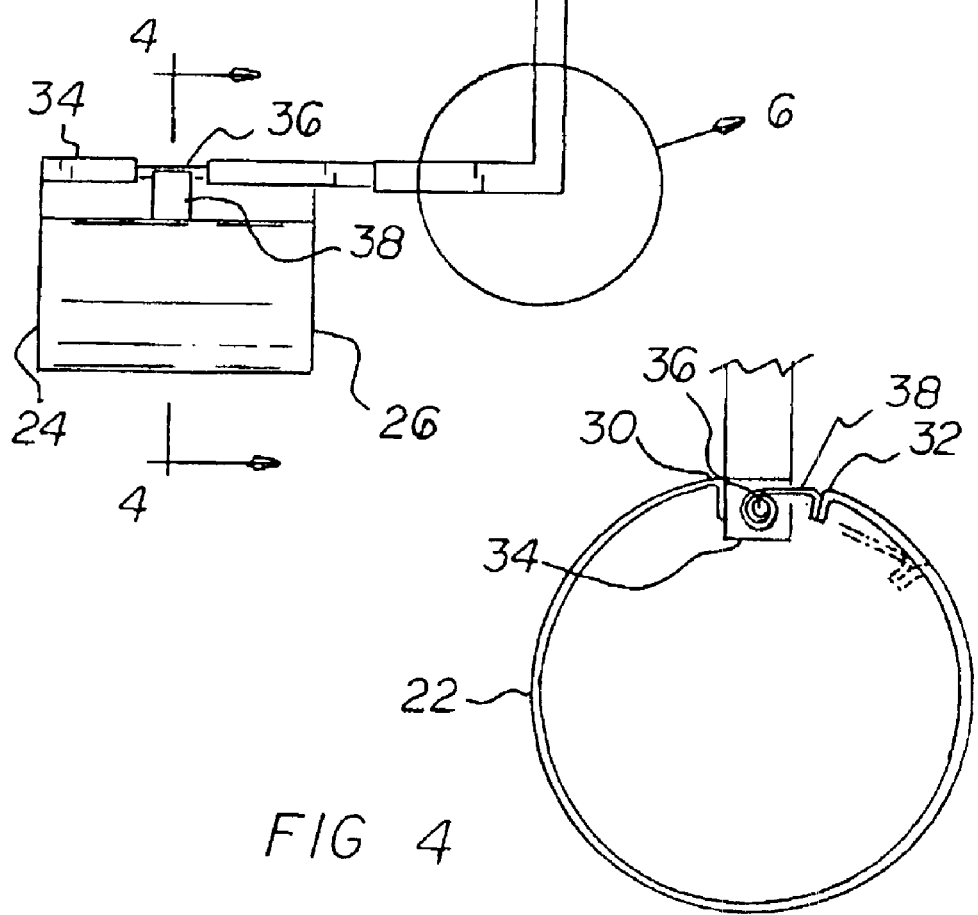
FIG 3
FIG 4

METER INSTALLATION SYSTEM

BACKGROUND OF THE INVENTION

1. Field of the Invention

The present invention relates to a meter installation system and more particularly pertains to placing a measuring device in a flow of undesirable liquid.

2. Description of the Prior Art

The use of metering systems of known designs and configurations is known in the prior art. More specifically, metering systems of known designs and configurations previously devised and utilized for the purpose of placing devices in undesirable orientations through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,263,747 issued Jul. 24, 2001, to Carson et al. is entitled remote installation method and tool. U.S. Pat. No. 3,922,921 issued Dec. 2, 1975, to Woo is entitled method and apparatus for measuring sewer sedimentation infiltration and flow. U.S. Pat. No. 1,747,933 issued Feb. 18, 1930, to Goodman is entitled expansion plug for pipes. U.S. Pat. No. 3,842,864 issued Oct. 22, 1974, to Riegel et al. discloses a stopping apparatus for pipe lines. Finally, U.S. Pat. No. 3,497,899 issued Mar. 3, 1970, and U.S. Pat. No. 3,444,578 issued May 20, 1969, both to Caperton disclose a manhole brace for sewer rod guide tube.

While these devices fulfill their respective, particular objectives and requirements, the aforementioned patents do not describe a meter installation system that allows placing a measuring device in a flow of undesirable liquid.

In this respect, the meter installation system according to the present invention substantially departs from the conventional concepts and designs of the prior art, and in doing so provides an apparatus primarily developed for the purpose of placing a measuring device in a flow of undesirable liquid.

Therefore, it can be appreciated that there exists a continuing need for a new and improved meter installation system which can be used for placing a measuring device in a flow of undesirable liquid. In this regard, the present invention substantially fulfills this need.

SUMMARY OF THE INVENTION

In view of the foregoing disadvantages inherent in the known types of metering systems of known designs and configurations now present in the prior art, the present invention provides an improved meter installation system. As such, the general purpose of the present invention, which will be described subsequently in greater detail, is to provide a new and improved meter installation system and method which has all the advantages of the prior art and none of the disadvantages.

To attain this, the present invention essentially comprises a measuring device adapted to collect information from an undesirable liquid without making human contact with the liquid. A hollow support arm is provided. The hollow support arm is of a generally rectilinear configuration with a first end and a second end and a central vertical portion there between. The first end extends horizontally perpendicular to the central portion and is adapted to be held by a user. The second end extends horizontally perpendicular to the central portion as well as perpendicular to the first end and is adapted to be placed in the undesirable liquid. Next provided is a generally cylindrical retention device with a proximal end and a distal end. The cylindrical retention device has a vertical slit extending between the proximal end and the distal end. The slit defines a first edge and a second edge. A generally rectangular hollow coupling bar lies adjacent to the first edge and the proximal end. A swivel is next provided. The swivel is secured in line with the hollow coupling bar. The swivel has a flexible strap coupled between the swivel and the second edge. In this manner the diameter of the cylindrical retention device may be varied between a closed position adapted to retain the measuring device and an open position to release the measuring device within the flow of undesirable liquid. Next provided is a crank. The crank is adjacent to the first end of the support arm. The crank is adapted to allow the user to supply rotational energy. A series of beveled gears are provided next. The gears are adapted to transmit rotational energy from the crank through the hollow support arm and to the swivel to facilitate changing the retention device between the open position and the closed position. Finally, a screw lock is provided. The screw lock is in the central portion of the support arm adjacent to the first end. The screw lock is adapted to prevent rotation of the beveled gears to maintain the retention device in the open position and the closed position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved meter installation system which has all of the advantages of the prior art metering systems of known designs and configurations and none of the disadvantages.

It is another object of the present invention to provide a new and improved meter installation system which may be easily and efficiently manufactured and marketed.

It is further object of the present invention to provide a new and improved meter installation system which is of durable and reliable constructions.

An even further object of the present invention is to provide a new and improved meter installation system which is susceptible of a low cost of manufacture with regard to both materials and labor, and which accordingly is then susceptible of low prices of sale to the consuming public, thereby making such meter installation system economically available to the buying public.

Even still another object of the present invention is to provide a meter installation system for placing a measuring device in a flow of undesirable liquid.

Lastly, it is an object of the present invention to provide a new and improved installation system having a hollow support arm with a first end and a second end and a central vertical portion there between. A retention device has a vertical slit defining a first edge and a second edge. A coupling bar lies adjacent to the first edge. A swivel is secured in line with the hollow coupling bar and has a flexible strap coupled between the swivel and the second edge to enable the diameter of the cylindrical retention device to vary. A crank adjacent to the first end of the support arm allows the user to supply rotational energy. A series of beveled gears transmit rotational energy from the crank through the hollow support arm and to the swivel to facilitate changing the retention device between the open position and the closed position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view taken along line 3—3 of FIG. 2.

FIG. 4 is a cross sectional view taken along line 4—4 of FIG. 3.

The same reference numerals refer to the same parts throughout the various Figures.

DESCRIPTION OF THE PREFERRED EMBODIMENT

Figure 1:
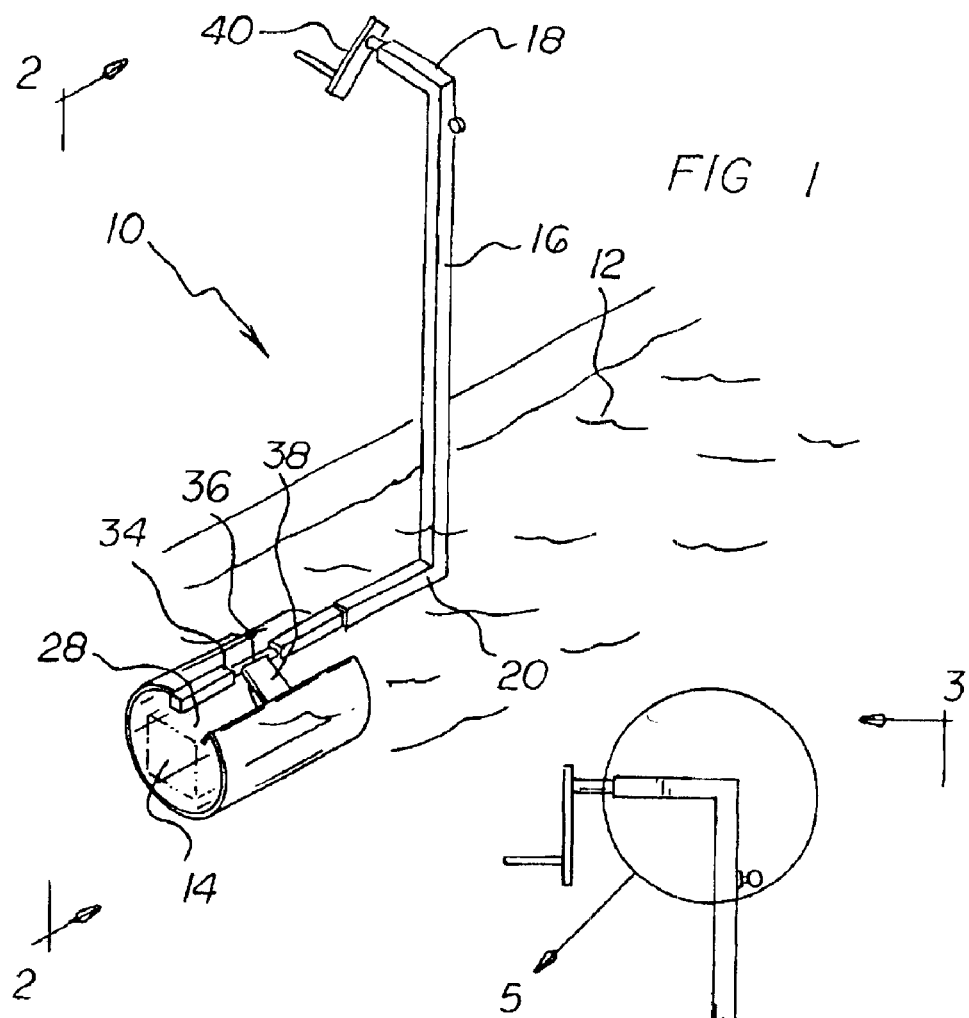
FIG. 1 is a perspective illustration of the meter installation system constructed in accordance with the principles of the present invention.

With reference now to the drawings, and in particular to FIG. 1 thereof, the preferred embodiment of the new and improved meter installation system embodying the principles and concepts of the present invention and generally designated by the reference numeral 10 will be described.

The present invention, the meter installation system 10 is comprised of a plurality of components. Such components in their broadest context include a hollow support arm, a retention device, a crank, and a series of beveled gears. Such components are individually configured and correlated with respect to each other so as to attain the desired objective.

First provided is a measuring device 14 adapted to collect information from an undesirable flowing liquid 12, such as sewage, without making human contact with the liquid.

A hollow support arm 16 is provided. The hollow support arm is of a generally rectilinear configuration with a first end 18 and a second end 20 and a central vertical portion 2 there between. The first end extends horizontally perpendicular to the central portion and is adapted to be held by a user. The second end extends horizontally perpendicular to the central portion as well as perpendicular to the first end and is adapted to be placed in the undesirable liquid.

Next provided is a generally cylindrical retention device 22 with a proximal end 24 and a distal end 26. The cylindrical retention device has a vertical slit 28 extending between the proximal end and the distal end. The slit defines a first edge 30 and a second edge 32. A generally rectangular hollow coupling bar 34 lies adjacent to the first edge and the proximal end.

Figure 2:
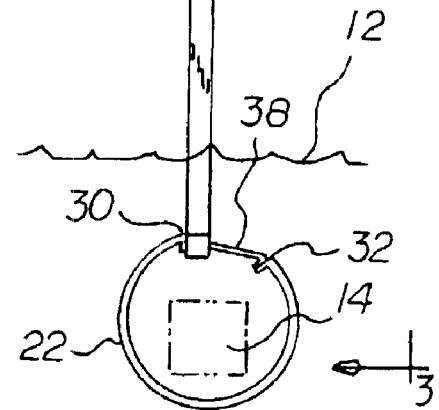
FIG. 2 is a front elevational view taken along line 2—2 of FIG. 1.
Figure 5:
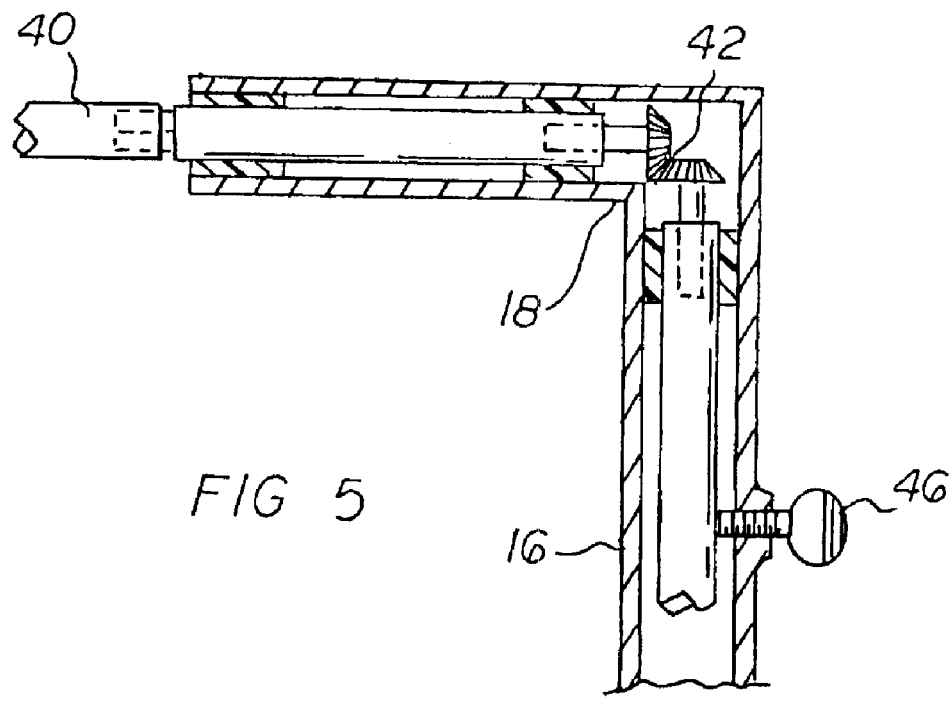
FIG. 5 is a cross sectional view of the upper region of the support arm.
Figure 6:
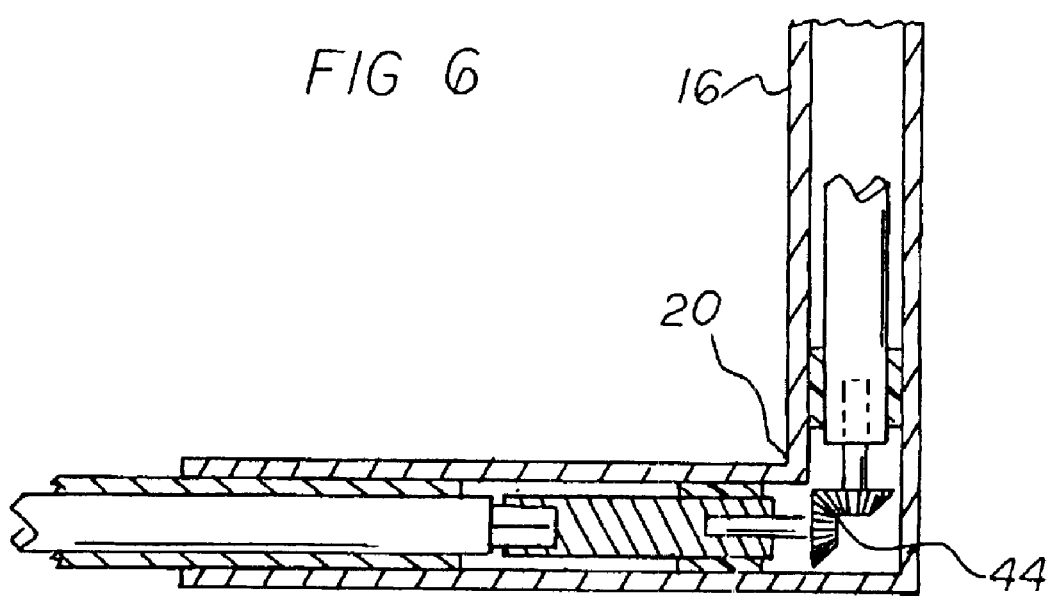
FIG. 6 is a cross sectional configuration taken at the lower extent of the support arm.

A swivel 36 is next provided. The swivel is secured in line with the hollow coupling bar. The swivel has a flexible strap 38, preferably plastic, coupled between the swivel and the second edge. In this manner the diameter of the cylindrical retention device may be varied between a closed position adapted to retain the measuring device and an open position to release the measuring device within the flow of undesirable liquid. Note FIG. 4 illustrates the closed position and FIG. 2 illustrates the open position.

Next provided is a crank 40. The crank is adjacent to the first end of the support arm. The crank is adapted to allow the user to supply rotational energy.

A series of beveled gears 42, 44 are provided next. The gears are adapted to transmit rotational energy from the crank through the hollow support arm and to the swivel to facilitate changing the retention device between the open position and the closed position.

Finally, a screw lock 46 is provided. The screw lock is in the central portion of the support arm adjacent to the first end. The screw lock is adapted to prevent rotation of the beveled gears to maintain the retention device in the open position and the closed position.

The hollow support arm and components there within are shown as being of one specific length. It should be understood that they could be of any desired length for a particular application. In addition, the support arm and components may be constructed of separate interconnectable components to accommodate use at different depths.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An installation system for placing a measuring device in a flow of undesirable liquid comprising, in combination:

an undesirable flowing liquid from which the user desires to collect information without making human contact;

a measuring device adapted to collect information;

a hollow support arm of a generally rectilinear configuration with a first end and a second end and a central vertical portion there between, the first end extending horizontally perpendicular to the central portion and being adapted to be held by a user, the second end extending horizontally perpendicular to the central portion as well as perpendicular to the first end and adapted to be placed in the undesirable liquid;

a generally cylindrical retention device with a proximal end and a distal end, the cylindrical retention device having a vertical slit extending between the proximal end and the distal end and defining a first edge and a second edge, a generally rectangular hollow coupling bar lying adjacent to the first edge and the proximal end;

a swivel secured in line with the hollow coupling bar and having a flexible strap coupled between the swivel and the second edge to enable the diameter of the cylindrical retention device to vary between a closed position adapted to retain the measuring device and an open position to release the measuring device within the flow of undesirable liquid;

a crank adjacent to the first end of the support arm and adapted to allow the user to supply rotational energy;

a series of beveled gears adapted to transmit rotational energy from the crank through the hollow support arm and to the swivel to facilitate the changing the retention device between the open position and the closed position; and a screw lock in the central portion of the support arm adjacent to the first end and adapted to prevent rotation of the beveled gears to maintain the retention device in the open position and the closed position.

2. A meter installation system comprising:

a hollow support arm with a first end and a second end and a central vertical portion there between;

a retention device having a vertical slit defining a first edge and a second edge with a coupling bar lying adjacent to the first edge;

a swivel secured in line with the hollow coupling bar and having a flexible strap coupled between the swivel and the second edge to enable the diameter of the cylindrical retention device to vary;

a crank adjacent to the first end of the support arm and adapted to allow a user to supply rotational energy; and a series of beveled gears adapted to transmit rotational energy from the crank through the hollow support arm and to the swivel to facilitate changing the retention device between the open position and the closed position.

3. The system as set forth in claim 2 and further including a screw lock in the central portion of the support arm adjacent to the first end and adapted to prevent rotation of the beveled gears to maintain the retention device in the open position and the closed position.

* * * * *